C. A. B. R. BRÅKENHIELM.
BALL RETAINER FOR RADIAL BALL BEARINGS.
APPLICATION FILED NOV. 30, 1918.
1,352,110. Patented Sept. 7, 1920.
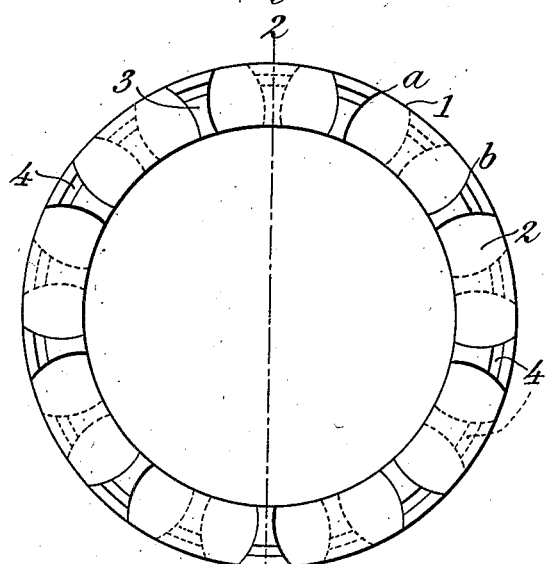
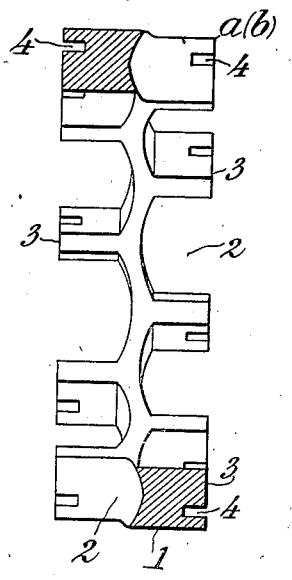
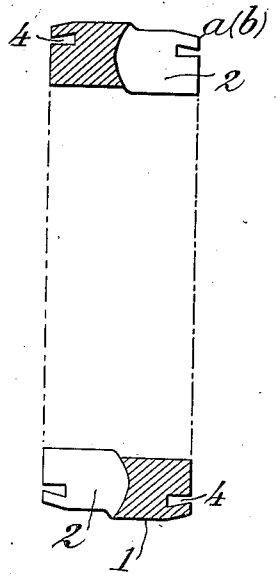
INVENTOR:
Carl Alvar Bernhard Runstin Bråkenhielm
BY
ATTORNEYS.

UNITED STATES PATENT OFFICE.

CARL ALVAR BERNHARD RUNSTEN BRÅKENHIELM, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-RETAINER FOR RADIAL BALL-BEARINGS.

1,352,110.  Specification of Letters Patent.  Patented Sept. 7, 1920.

Application filed November 30, 1918. Serial No. 264,801.

*To all whom it may concern:*

Be it known that I, CARL ALVAR BERNHARD RUNSTEN BRÅKENHIELM, a subject of the King of Sweden, residing at Gottenborg, in the Kingdom of Sweden, have invented new and useful Improvements in Ball-Retainers for Radial Ball-Bearings, of which the following is a specification.

This invention relates to ball retainers for radial ball bearings, and particularly to ball retainers of the kind comprising one or more rings having laterally open bores or impressions substantially cylindrical in shape and serving as pockets for the balls.

The object of the invention is to provide a ball retainer of the said kind which positively retains the balls at the one track ring whether or not the balls be sustained by the other track ring. This feature is of great importance, particularly in ball bearings in which the balls placed at the one bearing ring are capable of being brought out of engagement with the races of the other bearing ring, as for instance in so-called self-alining ball bearings having a spherical outer or inner track ring or in so-called three part bearings (magnet bearings), in which the inner track ring together with the balls is movable axially in relation to the outer track ring and may be removed from the said latter ring.

This condition is obviously fulfilled if the circle determined by the two outermost points of a ball pocket and by a third point situated at the outer shoulder of the grooved bearing ring symmetrically in relation to the two first mentioned points is less than the great circle of a ball, the capability of the ball retainer of holding the balls at the said bearing ring being increased as the diameter of the aforesaid circle decreases or, which is the same, as the relative distances of the said three points decrease.

With this object in view, it has been previously proposed to provide the intermediate walls separating the ball pockets with relatively wide slots or notches running in a substantially peripheral direction. In such manner, laps or tongues are formed at the outer and at the inner periphery of the ball retainer ring, and these laps or tongues are bent in a direction toward each other and thus brought to partly embrace the balls so that the latter are prevented from falling out laterally. This entails, however, a considerable weakening of the ball retainer and necessitates the insertion of the balls into the bearing before bending the tongues of the ball retainer, and, moreover, the balls cannot be removed from the bearing without bending the tongues back into their original position. Furthermore, the drawback arises that the balls do not obtain an uninterrupted bearing surface in the peripheral direction, but they are caused to bear against the inner sharp edges of the tongues.

The said inconveniences are overcome, according to this invention, by making the slots or notches in the partitions separating the ball pockets relatively narrow and placing same in the proximity of the outer or of the inner periphery of the ball retainer ring so that each of said intermediate walls forms partly a rigid member serving as a support for the balls and partly an elastic tongue bent in a direction toward the rigid part and preventing the balls from falling out. This enables the ball retainer to be finished before it is placed with the balls in the bearing, and, moreover, the balls may be removed from the bearing without the tongues being bent, inasmuch as the filling in as well as the removing of the balls is performed by making use of the elasticity of the ball retainer. Furthermore, the balls obtain an uninterrupted bearing surface in the peripheral direction against the rigid part of the intermediate wall.

In the drawing, I have illustrated, by way of example, an embodiment of a bored ball retainer for a double row radial ball bearing. Figure 1 is an end view of the ball retainer. Fig. 2 is an axial section thereof. Fig. 3 shows schematically an axial section of the finished ball retainer.

Referring to the drawing, 1 designates the ball retainer, which is provided, in a known manner, with axially bored recesses forming ball pockets 2. In the form of embodiment shown, which is particularly adapted for use in a double row self-alining ball bearing having a spherical outer ball race, the intermediate walls 3 separating the ball pockets are provided, in the proximity of the outer (or inner) periphery of the ball retainer ring, with notches 4 made by turning in one working operation. The outer, elastic parts of the partitions 3 are then pressed by a suitably funnel-shaped press tool, toward the rigid parts, so that the ball retainer obtains the form shown in Fig. 3. By this means, the distance between the two outermost points $a$ and $b$ of a ball pocket as well as the distance between the said points and the outer shoulder of the inner bearing ring decreases so that the balls will be positively retained at the said bearing ring independently of the bearing support at the outer bearing ring, and, at the same time, the filling in of the last balls is facilitated on account of the increased elasticity of the ball retainer. The walls 3 between the recesses or pockets 2 are solid or unslitted where they come between the successive balls, thus receiving unyieldingly the thrust imparted by the traveling balls, and forming solid abutments between the balls. The elastic portions of the intervening walls are limited to the portions formed by the notches 4, which for this purpose are formed suitably near to the outer (or inner) periphery of the ring.

If the ball retainer be adapted for use in self-alining ball bearings having a spherical inner track ring, the notches are arranged in the proximity of the inner periphery of the ball retainer ring, instead of at the outer one.

Obviously, the invention is also applicable to ball retainers of the kind described which are made of pressed sheet metal and in which the ball pockets are formed by laterally open axial impressions. Also, the invention is applicable in connection with bearings, analogous to ball bearings, wherein the rolling elements, instead of being spherical, are modified more or less from such form, and which, for the purposes of this invention, are the equivalent of ball bearings.

What I claim is:—

1. A ball retainer for radial ball bearings consisting of a ring having laterally open recesses serving as pockets for the balls, the intermediate walls separating the said recesses being provided with notches, said notches being arranged closely adjacent to one periphery of the ball retainer ring, so that each intermediate wall forms partly a rigid part serving as a support for the balls and partly a yielding tongue, said tongue slightly bent in a direction toward the rigid part and serving as a resilient retaining member for the balls.

2. A ball retainer according to claim 1, the walls between the pockets being wider at their outer sides than at their inner sides, and the notches being nearer the outer periphery.

3. A ball retainer according to claim 1, the walls between the pockets being uninterrupted between the centers of successive pockets, whereby to afford solid abutments between successive balls.

4. A ball retainer according to claim 1, the tongues being free at their outer ends, to form resilient retaining members for the balls.

In testimony whereof I affix my signature.

CARL ALVAR BERNHARD
RUNSTEN BRÅKENHIELM.